United States Patent
Zhao et al.

(10) Patent No.: US 6,599,577 B2
(45) Date of Patent: Jul. 29, 2003

(54) METHOD OF PREPARATION FOR A DEGRADABLE, WATER AND OIL RESISTANT PROTECTIVE MEMBRANE

(75) Inventors: Xiaojiang Zhao, Changchun (CN); Xianhong Wang, Changchun (CN); Fosong Wang, Changchun (CN)

(73) Assignee: Changchun Institute of Applied Chemistry-Chinese Academy of Sciences, Changchun (CN)

( * ) Notice: Subject to any disclaimer, the term of this patent is extended or adjusted under 35 U.S.C. 154(b) by 28 days.

(21) Appl. No.: 10/072,249

(22) Filed: Feb. 8, 2002

(65) Prior Publication Data

US 2003/0018162 A1 Jan. 23, 2003

(30) Foreign Application Priority Data

Jul. 19, 2001 (CN) .................................... 01 1 20532 A

(51) Int. Cl.[7] .................................................. B05D 7/26
(52) U.S. Cl. ...................... 427/386; 427/154; 427/155; 427/389.9; 427/391; 427/392; 427/393
(58) Field of Search ................................ 427/154, 155, 427/386, 389.9, 391, 392, 393

(56) References Cited

U.S. PATENT DOCUMENTS

| 3,585,168 A | * | 6/1971 | Inoue et al. | 528/371 |
| 3,900,424 A | * | 8/1975 | Inoue et al. | 502/156 |
| 3,953,383 A | * | 4/1976 | Inoue et al. | 528/413 |

* cited by examiner

*Primary Examiner*—Robert Dawson
*Assistant Examiner*—Christopher M Keehan
(74) *Attorney, Agent, or Firm*—Alston & Bird LLP

(57) ABSTRACT

The present invention provides a method of preparation for a degradable, water and oil resistant protective membrane. In the said method, carbon dioxide copolymer is dissolved in a low toxic or non-toxic solvent to form a solution of 3–6 wt % concentration. After standing and filtration to remove metal oxide, the solution is used to coat the surface of the fabricated starch, paper pulp, or straw tableware by spraying or dipping. The residual solvent is removed by drying process and a degradable, water and oil resistant and transparent protective membrane is obtained. The thickness of the protective membrane is in the range of 10–20 micrometer. Metal ion content is lower than 1 ppm. No leakage and deformation of the tableware are observed after the tableware is immerged in water or edible oil for 4 hours at 80° C. The decoloration test by cold edible oil and ethanol is negative. Fungus test gives grade V.

19 Claims, No Drawings

METHOD OF PREPARATION FOR A DEGRADABLE, WATER AND OIL RESISTANT PROTECTIVE MEMBRANE

FIELD OF THE INVENTION

The present invention relates to the method of preparation for a degradable, water and oil resistant protective membrane.

BACKGROUND OF THE INVENTION

Although the disposable tableware (lunch box, bowl, plate and cup) made mainly from polymeric foam of polystyrene has the advantage of lower price, their applications have been greatly hindered due to the existence of "diphenol hormone effect" and "white polymeric foam pollution". In Chinese patent documents CN 1,255,508A and CN 1,273,255A, it was disclosed that starch was used as the main raw material for the manufacture of disposable tableware and packaging utensils. Although large amount of starch was used and the resources of the starch are abundant, tableware made from them could not withstand water and oil satisfactorily. Chinese patent documents CN 1,234,802A disclosed the use of straw as the main raw material for the manufacture of disposable tableware. The product thus obtained had the color of soil yellow, soil white or soil brown which was unacceptable and in addition an adhesive was needed. In Chinese patent documents CN 1,206,675A, paper pulp was used as the main raw material for the manufacture of disposable tableware. In that case the main raw material was wood pulp and thus serious limitation was imposed on the raw material. Furthermore, in that technique, polyvinylidene chloride blended with polyacrylate should be used as a water-resisting agent.

U.S. Pat. Nos. 3,585,168, 3,900,424 and 3,953,383 disclosed the use of alkyl zinc/active hydrogen containing compound as the catalyst to prepare alternating copolymer ($M_n$>20,000) of carbon dioxide and epoxide as well as different kinds of polyurethanes and polyethers. Japanese patent kokai publications JP 02,575,199 and JP 02,142,824 disclosed the use of expensive metal coordination compound of porphyrin as the catalyst. But the polymer obtained had relatively low molecular weight (about 5,000). In Chinese patent No. ZL 89100701.6 and ZL 91109459.8, the obtained polymers were difficult to be purified and their molecular weight needed to be raised. Chinese patent document CN 1,257,885 provided a method of preparation for high molecular weight aliphatic polycarbonate. Chinese patent document 00136189.9 disclosed the use of rare earth catalyst to synthesize a copolymer of epoxide and carbon dioxide with a molecular weight of 80,000–200,000, a content of alternating structure larger than 98% and a degree of fixation of carbon dioxide over 40 wt %. The said copolymer of carbon dioxide is soluble in solvents such as dichloromethane, chloroform, tetrahydrofuran, dioxane, butyl formate, ethyl acetate, butyl acetate etc.

Copolymers of carbon dioxide, aliphatic polycarbonate with high content of alternating structure synthesized from carbon dioxide and epoxide are not only photodegradable but also biodegradable plastics due to existence of ester bonds in its main chain. Carbon dioxide copolymer membrane with high molecular weight possesses good transparency and good barrier property to oxygen and water. They are expected to have wide applications in the fields of disposable tableware, degradable packaging material for pharmaceutics and foodstuff as well as composites.

DISCLOSURE OF THE INVENTION

The objective of the present invention is to provide a method of preparation for a degradable, water and oil resistant protective membrane or coating. The said protective membrane mainly consists of a copolymer of carbon dioxide and epoxide. It possesses good oxygen barrier property. The said carbon dioxide copolymer is dissolved in a low toxic or non-toxic solvent to form a solution of concentration of 3–6 wt %. The surface of the fabricated starch tableware is then coated with this solution by spraying or dipping. The residual solvent is removed by drying process and a degradable, water and oil resistant and transparent protective membrane is obtained.

The binary copolymers of epoxide and carbon dioxide used in the present invention are those of ethylene oxide-carbon dioxide; propylene oxide-carbon dioxide, styrene oxide-carbon dioxide and cyclohexene oxide-carbon dioxide. The molecular weights of the binary copolymer are in the range of 80,000–200,000. Their contents of alternating structure are large than 98% with carbon dioxide content over 40 wt %. The ternary copolymers used are those of epoxide-carbon dioxide-acid anhydride. The epoxides used are ethylene oxide, propylene oxide, styrene oxide or cyclohexene oxide. The acid anhydrides used are maleic anhydride, fumaric anhydride or succinic anhydride. The molecular weights of the ternary copolymers are 80,000–200,000. Their contents of alternating structure are larger than 98% with carbon dioxide content over 40 wt %.

According to Chinese patent CN 1,257,885, a typical procedure to prepare the said carbon dioxide copolymer was described as follows. The aged $Nd(CCl_3COO)_3/ZnEt_2$/glycerin(containing 0.00075 mol, 0.015 mol $ZnEt_2$, 0.015 mol glycerin, and 0.150 mol propylene carbonate, aged at 20 atm of $CO_2$ atmospheric pressure for 12 hrs) was used as the catalyst. The catalyst and 80 ml propylene oxide were put into the autoclave in the absence of oxygen, and then $CO_2$ was quickly filled in till 30 atm. The polymerization was carried out at 70° C. for 10 hrs. The reaction was terminated by addition of 5% HCl/methanol solution, and the precipitate was dried under vacuum till constant weight. The propylene oxide conversion was 69%. The final yield was $8.04 \times 10^4$ g polymer/mol Nd. $^1$H NMR measurement showed that the content of alternative sequence structure was over 98%. Number average molecular weight was 140,000, and the glass transition temperature was 39.1° C.

A typical procedure for preparing the ternary copolymer of present invention is as follows. The aged $Nd(CCl_3COO)_3/ZnEt_2$/glycerin (containing 0.00075 mol, 0.015 mol $ZnEt_2$, 0.015 mol glycerin, and 0.150 mol propylene carbonate, aged at 20 atm of $CO_2$ atmospheric pressure for 12 hrs) was used as the catalyst. The catalyst and 75 ml propylene oxide and 5 ml of cyclohexene oxide were put into the autoclave in the absence of oxygen, and then $CO_2$ was quickly filled in till 40 atm. The copolymerization was carried out at 70° C. for 10 hrs. The reaction was terminated by addition of 5% HCl/methanol solution, and the precipitate was dried under vacuum till constant weight. The final yield was $7.1 \times 10^4$ g polymer/mol Nd. Number average molecular weight was 110,000, and the glass transition temperature was 60.5° C.

Solvents used in this invention include one of the following solvents: dichloromethane, chloroform, tetrahydrofuran, dioxane, butyl formate, ethyl acetate, propyl acetate, ethyl propionate, methyl butyrate, butyl acetate or mixed solvent of more than two of the above-mentioned solvents. The preferred solvent is one or more of esters selected from the group consisting of butyl formate, ethyl acetate, propyl acetate, ethyl propionate, methyl butyrate and butyl acetate. The ratios of the mixed solvents are 95–98:5–2; 95–98:3–1:2–1. The embodiment of the process is as follows: The binary or ternary copolymer of epoxide and carbon dioxide is dissolved in a low toxic or non-toxic solvent to form a solution of concentration of 3–6 wt %. The solution is allowed to stay for 2–12 hours and then filtered or centrifuged. The filtrate is allowed to stay for another 2–6 hours and followed by filtration or centrifugation to remove the residual metal oxide. The content of metal ions in the filtrate should be below 5.0 ppm. The said filtrate of binary or ternary copolymer solution of carbon dioxide with metal ion content lower than 5.0 ppm is used directly to coat the surface of tableware made of starch, straw or paper pulp by spraying or dipping. The thickness of the protective membrane on the surface of starch, straw or paper pulp vessel is in the range of 10–20 micrometer. The weight of copolymer is 8–12 wt % of that of tableware. Metal ion content in the tableware is lower than 1 ppm. No leakage and deformation of the tableware are observed after the tableware is immerged in water or edible oil for 4 hours at 80° C. The decoloration test by cold edible oil and ethanol is negative. Fungus test gives grade V.

EMBODIMENTS OF THE INVENTION

EXAMPLE 1

20 g of propylene oxide-carbon dioxide binary copolymer with the content of alternating structure higher than 98%, number average molecular weight 87,000 and glass transition temperature, $T_g$, of 40.1° C. was dissolved in 400 ml dichloromethane to form a solution of concentration at 5 wt %. The solution was allowed to stay for 10 hours and then was filtered to remove the metal oxide. The filtrate was allowed to stay for another 5 hours and was filtered once again. Dichloromethane was added to the filtrate to make a solution of 3 wt %. The said solution was sprayed on the surface of starch tableware at room temperature. After drying by bake, the thickness of the protective membrane is 15 micrometer. Metal ion content in the tableware is lower than 1 ppm. No leakage and deformation of the tableware are observed after the tableware is immerged in water or edible oil for 4 hours at 80° C. The decoloration test by cold edible oil and ethanol is negative. Fungus test gives grade V.

EXAMPLE 2

20 g of propylene oxide-carbon dioxide binary copolymer with the content of alternating structure higher than 98%, number average molecular weight 123,000 and $T_g$ of 41.1° C. was dissolved in 400 ml ethyl acetate to form a solution of concentration at 5 wt %. The solution was allowed to stay for 8 hours and then was filtered to remove the metal oxide. The filtrate was allowed to stay for another 6 hours and was filtered once again. Ethyl acetate was added to the filtrate to make a solution of 3 wt %. The said solution was used to coat the surface of starch tableware by dipping at room temperature. After drying by bake, the thickness of the protective membrane is 20 micrometer. Metal ion content in the tableware is lower than 1 ppm. No leakage and deformation of the tableware are observed after the tableware is immerged in water or edible oil for 4 hours at 80° C. The decoloration test by cold edible oil and ethanol is negative. Fungus test gives grade V.

EXAMPLE 3

10 g of propylene oxide-carbon dioxide-succinic anhydride ternary copolymer with the content of alternating structure higher than 98%, number average molecular weight 196,000 and $T_g$ of 42.5° C. was dissolved in 200 ml butyl acetate to form a solution of concentration at 5 wt %. The solution was allowed to stay for 10 hours and then was filtered to remove the metal oxide. The filtrate was allowed to stay for another 4 hours and was filtered once again. Butyl acetate was added to the filtrate to make a solution of 3.5 wt %. The said solution was sprayed on the surface of starch tableware at room temperature. After drying by bake, the thickness of the protective membrane is 14 micrometer. Metal ion content in the tableware is lower than 1 ppm. No leakage and deformation of the tableware are observed after the tableware is immerged in water or edible oil for 4 hours at 80° C. The decoloration test by cold edible oil and ethanol is negative. Fungus test gives grade V.

EXAMPLE 4

20 g of propylene oxide-carbon dioxide-maleic anhydride ternary copolymer with the content of alternating structure higher than 98%, number average molecular weight 115,000 and $T_g$ of 40.6° C. was dissolved in 400 ml ethyl acetate/octyl acetate mixed solvent with weight ratio of 80:20 to form a solution of concentration at 5 wt %. The solution was allowed to stay for 12 hours and then was filtered to remove the metal oxide. The filtrate was allowed to stay for another 2 hours and was filtered once again. Ethyl acetate/octyl acetate mixed solvent with weight ratio of 80:20 was added to the filtrate to make a solution of 3 wt %. The said solution was sprayed on the surface of straw tableware at room temperature. After drying by bake, the thickness of the protective membrane is 10 micrometer. Metal ion content in the tableware is lower than 1 ppm. No leakage and deformation of the tableware are observed after the tableware is immerged in water or edible oil for 4 hours at 80° C. The decoloration test by cold edible oil and ethanol is negative. Fungus test gives grade V.

EXAMPLE 5

24 g of propylene oxide-carbon dioxide-cyclohexene oxide ternary copolymer with the content of alternating structure higher than 98%, number average molecular weight 82,000 and $T_g$ of 55.2° C. was dissolved in 400 ml dichloromethane to form a solution of concentration at 6 wt %. The solution was allowed to stay for 7 hours and then the metal oxide was removed by centrifugation. The centrifugate was allowed to stay for another 10 hours and was centrifuged once again. Dichloromethane was added to the centrifugate to make a solution of 5 wt %. The said solution was used to coat the surface of starch tableware by dipping. After drying by bake, the thickness of the protective membrane is 20 micrometer. Metal ion content in the tableware is lower than 1 ppm. No leakage and deformation of the tableware are observed after the tableware is immerged in water or edible oil for 4 hours at 80° C. The decoloration test by cold edible oil and ethanol is negative. Fungus test gives grade V.

EXAMPLE 6

The dichloromethane solution of carbon dioxide copolymer mentioned in Example 1 is sprayed on the surface of paper pulp tableware. After drying, the thickness of the protective membrane is 18 micrometer. Metal ion content in the tableware is lower than 1 ppm. No leakage and deformation of the tableware are observed after the tableware is immerged in water or edible oil for 4 hours at 80° C. The decoloration test by cold edible oil and ethanol is negative. Fungus test gives grade V.

EXAMPLE 7

The dichloromethane solution of carbon dioxide copolymer mentioned in Example 1 is used to coat the surface of fabricated straw tableware by dipping. After drying, the thickness of the protective membrane is 17 micrometer. Metal ion content in the tableware is lower than 1 ppm. No leakage and deformation of the tableware are observed after the tableware is immerged in water or edible oil for 4 hours at 80° C. The decoloration test by cold edible oil and ethanol is negative. Fungus test gives grade V.

What is claimed is:

1. A method for preparing a degradable water-resistant and oil-resistant protective membrane upon a tableware substrate, comprising:
    obtaining a copolymer of epoxide and carbon dioxide by catalytic reaction having a molecular weight between about 80,000 and about 200,000 wherein the copolymer structure is greater than 98% alternating and wherein the carbon dioxide content of the copolymer is greater than 40%;
    dissolving the copolymer in a solvent having little or no toxicity;
    holding the dissolved copolymer for a period of about 2 to about 12 hours;
    filtering the dissolved copolymer until the residual metal ion content of the dissolved copolymer remaining from catalysis is reduced below 5.0 ppm;
    adjusting the content of the dissolved copolymer to about 3 to about 6 wt % copolymer in solution;
    coating the tableware substrate with the dissolved copolymer; and
    drying the dissolved copolymer to a thickness of about 10 micrometers to about 30 micrometers.

2. The method of claim 1, wherein the copolymer is a binary copolymer of epoxide and carbon dioxide.

3. The method of claim 2, wherein the epoxide is selected from ethylene oxide, propylene oxide, styrene oxide, and cyclohexene oxide.

4. The method of claim 2, wherein the solvent is selected from dichloroform, chloroform, tetrahydrofuran, dioxane, and mixtures thereof.

5. The method of claim 4, wherein the solvent to copolymer ratio is from about 95:5 to about 98:2.

6. The method of claim 4, wherein the solvent is selected from butyl formate, ethyl acetate, propyl acetate, ethyl propionate, methyl butyrate, butyl acetate, octyl acetate, and mixtures thereof.

7. The method of claim 6, wherein the solvent to copolymer ratio is from about 95:5 to about 98:2.

8. The method of claim 1, wherein the copolymer is a tertiary copolymer of epoxide, carbon dioxide, and acid anhydride.

9. The method of claim 8, wherein the epoxide is selected from ethylene oxide, propylene oxide, styrene oxide, and cyclohexene oxide.

10. The method of claim 8, wherein the acid anhydride is selected from maleic anhydride, fumaric anhydride, and succinic anhydride.

11. The method of claim 8, wherein the solvent is selected from dichioroform, chloroform, tetrahydrofuran, dioxane, and mixtures thereof.

12. The method of claim 11, wherein the solvent to copolymer ratio is from about 95:3:2 to about 98:1:1.

13. The method of claim 11, wherein the solvent is selected from butyl formate, ethyl acetate, propyl acetate, ethyl propionate, methyl butyrate, butyl acetate, octyl acetate, and mixtures thereof.

14. The method of claim 13, wherein the solvent to copolymer ratio is from about 95:3:2 to about 98:1:1.

15. The method of claim 1, wherein the step of filtering the dissolved copolymer comprises:
    filtering the dissolved copolymer with a first filtering step;
    holding the dissolved copolymer for a period of about 2 hours to about 10 hours; and
    filtering the dissolved copolymer with a second filtering step.

16. The method of claim 1, wherein the step of filtering the dissolved copolymer comprises centrifugation.

17. The method of claim 1, wherein the step of filtration is continued until the content of metal ion is reduced below 1 ppm.

18. The method of claim 1, wherein the step of coating a substrate with the dissolved copolymer is carried out by spraying the dissolved polymer upon the substrate.

19. The method of claim 1, wherein the step of coating a substrate with the dissolved copolymer is carried out by dipping the substrate within the dissolved polymer.

* * * * *

UNITED STATES PATENT AND TRADEMARK OFFICE
CERTIFICATE OF CORRECTION

PATENT NO. : 6,599,577 B2
DATED : July 29, 2003
INVENTOR(S) : Xiajiang Zhao et al.

It is certified that error appears in the above-identified patent and that said Letters Patent is hereby corrected as shown below:

Column 6,
Line 17, "dichioroform" should read -- dichloroform --.

Signed and Sealed this

Thirtieth Day of September, 2003

JAMES E. ROGAN
*Director of the United States Patent and Trademark Office*